Dec. 21, 1965    R. KOMPFNER    3,224,331
SINUSOIDAL SHAPED LENS FOR LIGHT WAVE COMMUNICATION
Filed Dec. 22, 1961

INVENTOR
R. KOMPFNER
BY
Kenneth W. Mature
ATTORNEY

United States Patent Office 3,224,331
Patented Dec. 21, 1965

3,224,331
SINUSOIDAL SHAPED LENS FOR LIGHT WAVE
COMMUNICATION
Rudolf Kompfner, Middletown, N.J., assignor to Bell
Telephone Laboratories, Incorporated, New York, N.Y.,
a corporation of New York
Filed Dec. 22, 1961, Ser. No. 161,591
6 Claims. (Cl. 88—57)

This invention relates to optical maser communication systems and more particularly to lenses for use as energy redirecting and focusing devices in such systems.

In the area of transmission of signal bearing electromagnetic wave energy from point to point, there has been a constant expansion of the useful range of operating frequencies. In general, the trend is toward higher and higher frequencies. Recently, the advent of a continuously operable maser capable of generating coherent radiation at or near optical wavelengths, as described in an article appearing in Physical Review Letters, February 1, 1961, at page 106, and entitled "Population Inversion and Continuous Optical Maser Oscillations in a Gas Discharge Containing a He-Ne Mixture," by A. Javan, W. R. Bennett, Jr., and D. R. Herriott, has intensified the interest in the transmission of signal information on a modulated "light beam." Use of a solid state optical maser as a generator is also feasible.

However, the opening up of this new frequency range of communication has resulted in the realization that many of the well known signal manipulation techniques and structures common in the lower frequency ranges are no longer applicable. Accordingly, new techniques and associated structures in certain areas must be devised.

One such area involves the transmission medium itself.

One contemplated means for guiding coherent optical or near-optical frequency energy having wavelengths between $10^{-2}$ and $10^{-6}$ centimeters from point to point comprises a cylindrical tube which is known descriptively as a "light pipe." Since electromagnetic energy travels in rectilinear fashion, redirection means for changing the energy propagation direction without destroying its coherence will be necessary not only to follow nonlinear rights-of-way and to effect convenient changes in propagation direction at repeater stations but also to effect simple city to city transmission due to the curvature of the surface of the earth. In addition, the propagating energy beam spreads in physical extent due to diffraction effects and must be periodically concentrated, or refocused, if a desired maximum beam radius is to be preserved. From practical considerations, it is advantageous for the light beam redirection and concentration to occur at the same location.

As disclosed and claimed in my copending application Serial No. 161,566, filed December 22, 1961, confocal pairs of cylindrical reflectors can advantageously be used to effect energy redirection and concentration. However, for some purposes, the losses inherent in any energy reflection scheme are higher than desired. Likewise, losses in the prism equivalent of the cylindrical reflector pairs, also disclosed in the above copending application, are oftentimes undesirably high even with the finest optical quality glass. A third possible redirection and focusing scheme, certain aspects of which were also disclosed in the copending application, involves cylindrical lenses.

In the transmission of optical energy through transparent lenses, losses can arise from several causes among which are (1) reflection at the lens surface, (2) scattering at surface irregularities, (3) scattering in the body of the lens, and (4) absorption in the body of the lens. In general, losses due to surface reflection can be reduced by overlaying the surface with dielectric layers which act as impedance transformers or by inclining the lens surface at the angle known in the art as the Brewster angle, or both. Losses due to surface irregularities are minimized by using highly homogenous lens material and by careful polishing of the surfaces thereof. In order to reduce scattering and absorption losses within the body of the lens, however, in addition to the use of high quality lens materials, it is desirable that the lenses be as thin as possible. Furthermore, in long distance optical communication systems, a typical focal length for the concentrating lenses is of the order of hundreds of feet, and therefore, the surface curvature involved is relatively slight. It is apparent that considerable difficulty would be encountered in the grinding procedures involved with very thin, very long focus lenses.

It is, therefore, an object of the present invention to redirect and to focus coherent optical or near-optical frequency electromagnetic wave energy with low attendant internal scattering and absorption loss.

It is a further object of this invention to achieve redirection and concentration of optical frequency energy with low attendant internal loss by means of thin, long focus lenses.

It is a more specific object of the present invention to redirect and to concentrate coherent optical energy with lenses which are free from the critical grinding tolerances attendant prior art cylindrical lenses.

In accordance with the present invention, light energy redirection and concentration is accomplished by thin transparent dielectric lens members having a surface curvature produced by a physical deformation of a flat plate rather than by an external separate grinding procedure. In one preferred embodiment of the invention the lens members are characterized by a surface curvature corresponding to that of a sinusoidal cylinder. By incling such a lens, or a combination thereof, at the angle to the incident beam known in the art as the Brewster angle, energy reflection from the lens surface may be considerably reduced in addition to the internal loss reduction effected by the thin nature of the lens body.

A further aspect of the invention resides in the wide range of focal lengths available from adjusting the amount by which the lens plate is physically deformed.

The above and other objects of the present invention, its nature, and its various advantages and features will appear more fully from a consideration of the accompanying drawing and the detailed description thereof which follows:

Figure 1:
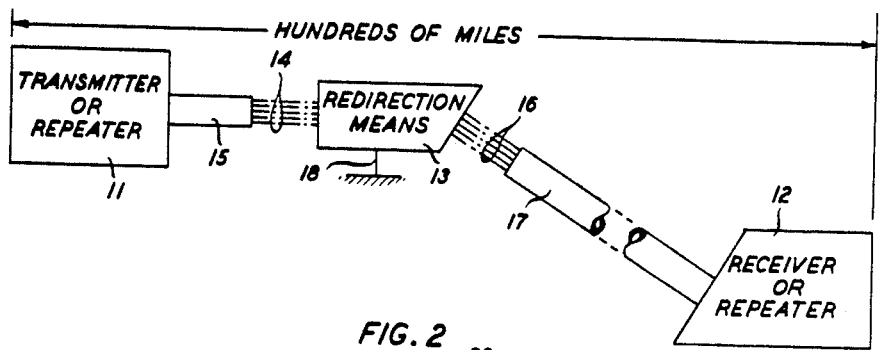
FIG. 1 is a diagrammatic representation of a communication system for coherent wave energy in the optical or near-optical frequency range.

Referring more particularly to FIG. 1, a light wave communication system is illustrated in which stations 11, 12 are either terminal points for the communication system or adjacent repeater stations therealong. In any event, the distance between stations is of the order of hundreds of miles and thus the system is properly characterized as "long." Since such long distances are involved, and since it is well known that the electromagnetic wave energy involved travels in straight lines, it is necessary for the light beam direction to be periodically changed, if not because of natural obstructions or right-of-way considerations, then because of the earth's curvature. In addition, periodic focusing of the beam to overcome diffraction effects is necessary. Therefore, interposed between stations 11, 12 and spaced at intervals determined by power level and transmission attenuation considerations are a plurality of energy redirection and concentration means such as element 13. Element 13 serves to receive energy rays 14 traveling in a first rectilinear direction through hollow cylindrical tube 15 and to refocus and to emit the received energy as rays 16 traveling through cylindrical tube 17 in a second rectilinear direction which is angularly related to said first direction. Tubes 15, 17 advantageously have a diameter sufficiently larger than the light beams enclosed thereby to have negligible influence, other than shielding, upon their propagation. These tubes can be evacuated, or they can be filled with an inert gas, such as argon, maintained, at a pressure at which scattering becomes unimportant. Furthermore, the light tubes or pipes can be buried underground along with redirectors 13 and their associated supporting platforms 18 or they can be mounted above ground. Supporting platforms 18 are vibration free and are decoupled from their surroundings such in the manner of seismographs and delicate galvanometers.

Typically, redirectors 13 are spaced apart by distances of between one half and one mile. Although only one redirector is illustrated in FIG. 1, tube 17 is broken to indicate the omission of similar redirectors spaced at typical intervals along the hundreds of miles of the illustrated system. Thus, signal information bearing energy originating at station 11 is received at station 12, having been redirected and refocused perhaps hundreds of times. In a similar manner, energy originating at station 12 is multiply redirected and refocused and is ultimately received at station 11.

In accordance with the present invention, redirectors 13 comprises first and second lenses which are flat dielectric plates deformed by physical forces into shapes approximating sinusoidal cylinders. An understanding of the lenses involved can be more completely obtained from a consideration of FIG. 2.

Figure 2:
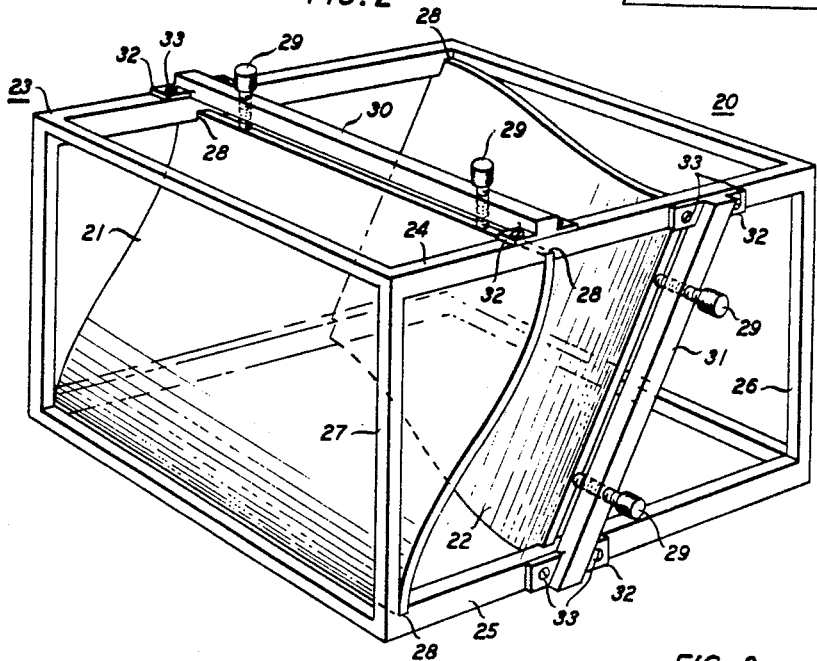
FIG. 2 is a perspective view of energy redirection and concentration means in accordance with the present invention.

FIG. 2 illustrates an energy redirector and concentrator 20 in accordance with the invention comprising sinusoidal "S" lenses 21, 22 mounted in retaining frame 23. Lenses 21, 22 comprise energy transparent sheets of optical quality dielectric material such as quartz or optical glass of which Corning No. 7056 is representative. The lenses advantageously have a thickness in the vicinity of 10 mils, and are physically stressed, by means to be more fully explained hereinafter, within frame 23 such that the focal planes associated with incident rays which are symmetrical about the lens centers are orthogonal. Typically, the stressed sheets have a maximum separation between the lens centers in the direction of light energy propagation which is less than one-tenth of one percent of the focal length of the redirector. Thus, the separation may be neglected in focal length considerations involving the lens combination. The physical dimensions of retaining frame 23 between oppositely disposed members 24, 25 and 26, 27 are selected to be smaller than the dimensions of sheets 21, 22, respectively, in the same direction. Thus, when sheets 21, 22 are placed within frame 23, a physical deformation of the former occurs. By positioning one edge of the dielectric sheet at one pair of corners of frame 23 and spacing the opposite parallel edge of the sheet away from an adjacent pair of corners of frame 23, the sheet takes the form approximately that of a sinusoidal cylinder. As illustrated in FIG. 2 the edges of plates 21, 22 are positioned in constraining recesses 28 in frame 23. In this manner the sense of curvature of one end portion of each sheet is physically constrained to be opposite to the sense of curvature of the other end portion. Thus, an approximately sinusoidal cylindrical curvature rather than a simple cylindrical curvature results.

The amount of curvature is controlled by machine screws 29 which extend through threaded apertures in transverse bars 30, 31 and which are positioned in abutting relationship to the edges of sheets 21, 22. Bars 30, 31 are fixed in position along frame 23 by fasteners 33 which extend through flanges 32 at each extremity of the bars and which engage frame 23. When it is desired, for reasons involving focal length consideration, to change the optical properties of "S" lenses 21, 22, machine screws 29 can be advanced or withdrawn as necessary.

Figure 3:
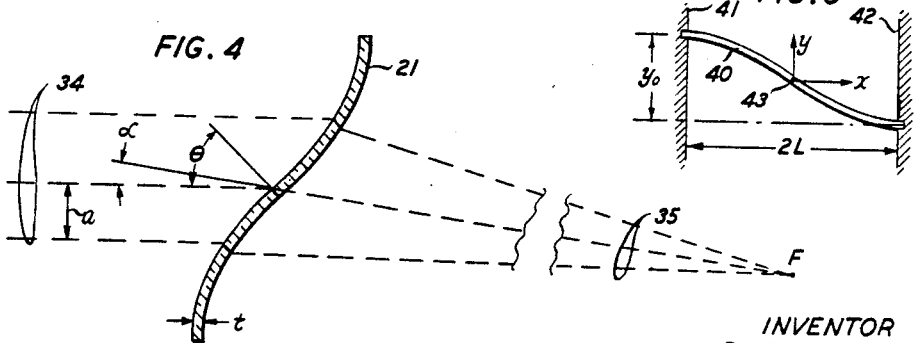
FIG. 3 is a theoretical model given for purposes of explanation.

The precise curvature produced by constraining frame 23, while closely approximating that of a sinusoidal cylinder, can be more accurately described by reference to FIG. 3, which is given for purposes of explanation. In FIG. 3 the ends of member 40 are supported at walls 41, 42 with zero curvature, and the member itself is mathematically described in an $x$, $y$ coordinate system with origin at point 43 as $$y = \frac{y_0}{4}\left[\frac{x^3}{L^3} - 3\frac{x}{L}\right] \tag{1}$$

where $L$ is one half the length of member 40 and $y_0$ is the vertical separation of the ends of member 40. While the above methematical description most accurately describes the curvature of lenses 21, 22 produced by retaining frame 23 in FIG. 2, it is not intended that the invention be limited in this respect. Thus, "S" lenses having curvature corresponding to that of Equation 1, corresponding to that of an ideal sine wave, or corresponding to descriptions falling between those mathematical descriptions are considered to be within the scope of the invention. In this connection, it should be noted that whereas the use of a frame such as frame 23 corresponds to the application of torque forces at the plate edges to produce deformation, any one of several alternative structures can be used to form the "S" lens. Thus, for example, a thin flat dielectric lens plate can be positioned against a supporting member which engages the perimeter of the plate and which has a preferred contour, such as that of a sinusoid. Alternatively, a master template having the desired sinusoidal or near sinusoidal curvature can be used as a casting means against which a dielectric plate is placed under pressure, heated and subsequently cooled, thereby imparting the desired curvature permanently to the lens plate.

Figure 4:
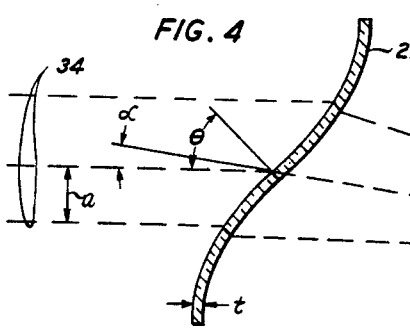
FIG. 4 is a cross sectional view of a lens in accordance with the invention also given for purposes of explanation.

The geometrical redirection and focusing properties of a sinusoidal lens in accordance with the invention may be more readily appreciated from a reference to FIG. 4 which is a transverse cross sectional view of such a lens. As illustrated in FIG. 4 lens 21 has a thickness $t$ and is disposed such that a normal to the zero curvature central portion thereof makes an angle $\theta$ with respect to the incident rays 34. Angle $\theta$ is commonly known as the Brewster angle and its magnitude depends upon the refractive index of the lens material, being the angle whose tangent equals that refractive index. By positioning the lens pair at the Brewster angle, reflections of incident energy polarized in the plane of incidence are minimized. One of the desired functions of lens 21 is to change the propagation direction of incident wave energy and therefore an angle $\alpha$ between incident rays 34 and existing rays 35 is defined. It can be shown by geometrical optics that light rays incident at an angle $\theta$ to the surface normal of a sheet of thickness $t$, radius of curvature $r$, and refractive index $n$ will pass therethrough with a deflection angle $\alpha$ defined as $$\alpha = \frac{t}{r+t} \sin\theta\left[\frac{1}{\sqrt{1-\sin^2\theta}} - \frac{1}{\sqrt{n^2 - \sin^2\theta}}\right]$$

If the sheet is a sinusoidal cylinder of the form $$y = \sin\frac{x}{\beta}$$

where $\beta$ equals the wavelength of the sinusoid divided by $2\pi$, and the rays are incident along and parallel to the $y$ axis, $\alpha$ will then vary along $x$ as $$\alpha = \frac{ta^2}{2\beta^3} \sin \frac{2x}{\beta} \left(1+\frac{a^2}{\beta^2} \cos^2 \frac{x}{\beta}\right)^{-\frac{3}{2}}$$
$$\left[1-\left[(n^2-1)\frac{a^2}{\beta_2} \cos^2 \frac{x}{\beta}+n^2\right]^{-\frac{1}{2}}\right]$$

where $a$ is the effective cross sectional radius of the circle of illumination of the lens. Near the center of the lens i.e., near $x=0$ the variation in $\alpha$ due to the bracketed expression above is very slight. Recalling the Brewster angle condition of ray incidence, the angle of redirection becomes, in approximation, $$\alpha \cong -\frac{tx}{\beta^2} \frac{(n^2-1)}{(n^2+1)^{3/2}}$$

The focal length of a sinusoidal "S" lens in the vicinity of its center is given by $$\frac{1}{|f|} = \frac{t}{\beta^2} \frac{(n^2-1)}{(n^2+1)^{3/2}}$$

In actual operation of an "S" lens redirector, it is clear that in order to obtain the desired function of focusing in two dimensions, two such lenses will be necessary, with focal planes orthogonal as described above with respect to FIG. 2. The angle of redirection is changed by laterally shifting the lens positions relative to each other.

As a typical example, with $n=1.5$, $t=10$ mils, and $f$ of the order of ⅔ mil, it can be shown that $\beta=22.5$ centimeters and therefore that the "wavelength" of the sinusoidal sheet, $2\pi\beta$, is 141 centimeters and that the "amplitude" of the sheet is 33.8 centimeters. Typically, the sheet has a sinusoidal extent of $\pi$ radians. In practice, however, only a very small area of the lens, near $x=y=0$ would be utilized, with an effective radius of the order of 2.5 centimeters. This ensures sharp focusing and a minimum deviation of the incident rays from Brewster angle condition. In the example given above, the deviation of the sheet 21 from flatness over an area of radius of 2.5 centimeters is approximately 5 microns.

In all cases, it is to be understood that the above described arrangements are illustrative of some of the specific embodiments which can represent an application of the principles of the invention. Numerous and varied other arrangements can be devised in accordance with these principles by those skilled in the art without departing from the spirit and scope of the invention.

What is claimed is:

1. Means for focusing electromagnetic wave energy propagating in a plane parallel to the $x, y$ plane of an $x, y, z$ coordinate system and having wavelengths in the range between $10^{-2}$ and $10^{-6}$ centimeters, said means comprising a thin energy transparent dielectric lens of constant thickness having first and second surfaces with curvature of the form $$y = \sin \frac{x}{\beta}$$

for a given range of values of $z$ where $\beta$ is the wavelength of the sinusoid divided by $2\pi$, said lens extending in said $x$ direction substantially equal distances from the line $x=n\pi\beta$ ($n=0,1,2\ldots$) over a total range of values of $x$ equal to or less than $\pi\beta$ units.

2. In combination with the means according to claim 1, means for illuminating said lens with said energy in the vicinity of $x=n\pi\beta$, $y=0$.

3. In a transmission system for electromagnetic wave energy in the optical or near-optical frequency range,
    means providing a beam of substantially parallel rays of said energy propagating rectilinearly in a given direction,
    means for receiving said rays when propagating rectilinearly in a second direction related to said given direction by a finite nonzero angle $\alpha$,
    and means for redirecting said rays from said given direction to said second direction,
    said last-mentioned means comprising a lens of constant thickness having first and second surfaces of sinusoidal curvature, said lens having a transverse physical extent which is less than one half period of said surface sinusoids and having a physical symmetry characterized by slopes of identical magnitude and sign at equal distances from the center line thereof,
    said given direction lying in a plane transverse to said sinusoidal surfaces.

4. The arrangement according to claim 1 in which said lens comprises a dielectric material having a refractive index $n$ and said rays are incident in said first direction upon the center of said lens at the angle whose tangent is $n$.

5. Means for focusing electromagnetic wave energy traveling in a single given rectilinear direction in a plane parallel to the $x, y$ plane of a given $x, y, z$ rectangular coordinate system comprising
    a thin dielectric lens of constant thickness having an index of refraction $n$ and first and second surfaces with curvature substantially described in said system by $$y = \left[\frac{x^3}{L^3} - 3\frac{x}{L}\right]$$

where $L$ is one half the extent of said lens in said plane,
    said lens being positioned in the path of said wave energy such that said path intersects said lens substantially at the lens center.

6. The arrangement described in claim 5 in which said lens is positioned with respect to said given direction such that the angle between said direction and the normal to the surface of said lens at the center of the area illuminated by said energy is equal to the angle having a tangent equal to $n$.

References Cited by the Examiner
UNITED STATES PATENTS

| | | | |
|---|---|---|---|
| 801,935 | 10/1905 | Trapp. | |
| 2,143,303 | 1/1939 | Darimont | 88—28.93 |
| 2,480,031 | 8/1949 | Kellogg | 88—28.93 |
| 2,961,926 | 11/1960 | Hoffmeister | 88—16 |
| 3,145,264 | 7/1964 | Schulz. | |

FOREIGN PATENTS

| | | |
|---|---|---|
| 333,663 | 1/1936 | Italy. |

JEWELL H. PEDERSEN, *Primary Examiner.*